United States Patent [19]

Singleton

[11] 3,872,025

[45] Mar. 18, 1975

[54] PRODUCTION AND UTILIZATION OF SYNTHESIS GAS

[75] Inventor: Alan H. Singleton, Emmaus, Pa.

[73] Assignee: Bethlehem Steel Corporation, Bethlehem, Pa.

[22] Filed: May 15, 1972

[21] Appl. No.: 253,363

Related U.S. Application Data

[63] Continuation-in-part of Ser. No. 873,777, Oct. 31, 1969, abandoned.

[52] U.S. Cl.............. 252/373, 62/23, 62/24, 62/27, 62/28, 252/374, 252/375, 252/376, 252/377, 260/449.5, 423/359, 423/655, 423/656
[51] Int. Cl............... C07c 2/02, C07c 2/06
[58] Field of Search ......... 260/449.5; 252/373, 374, 252/375, 376, 377; 423/655, 656; 48/197; 62/23, 24, 27, 28

[56] References Cited

UNITED STATES PATENTS

| 1,020,102 | 3/1912 | von Linde | 62/23 B |
|---|---|---|---|
| 1,020,103 | 3/1912 | Linde | 62/23 B |
| 1,296,992 | 3/1919 | Maxted | 252/377 |
| 1,511,800 | 10/1924 | Claude | 62/23 B |
| 1,830,610 | 11/1931 | Linde | 62/23 B |
| 2,293,601 | 8/1942 | Etienne | 252/374 UX |
| 2,729,954 | 1/1956 | Etienne | 62/28 |
| 2,960,476 | 11/1960 | Eastman et al. | 252/376 |
| 3,271,110 | 9/1966 | Bratzler | 23/213 |
| 3,407,146 | 10/1968 | Becker et al. | 252/377 |
| 3,441,393 | 4/1969 | Finneran et al. | 48/197 |
| 3,514,260 | 5/1970 | Baillie | 23/213 |
| 3,598,527 | 8/1971 | Quartulli et al. | 260/449.5 X |
| 3,615,355 | 10/1971 | Skinner | 260/449.5 X |

FOREIGN PATENTS OR APPLICATIONS

| 188,700 | 2/1957 | Austria | 252/374 |
|---|---|---|---|
| 471,068 | 1/1951 | Canada | 252/376 |

*Primary Examiner*—Howard T. Mars
*Attorney, Agent, or Firm*—Joseph J. O'Keefe; Charles A. Wilkinson

[57] ABSTRACT

In a method for producing high pressure synthesis gas from an industrial gas containing carbon monoxide, carbon dioxide is first removed from the gas stream and the stream is partially liquefied in a cryogenic recovery plant. Hydrogen and at least part of the nitrogen are separated from the liquefied gas by distillation, and the remaining liquid carbon monoxide is liquid pumped to from 500 to about 10,000 psia. Following pressurization, the liquid carbon monoxide is heated to above its boiling point, while controlling the pressure to produce a vaporized high pressure gaseous feed, also at from about 500-10,000 psia. Thereafter, the high pressure vaporized carbon monoxide is reacted with steam at high pressure in a conventional carbon monoxide shift reaction. The resulting high pressure hydrogen can be utilized in a process for the synthesis of methanol, ammonia, and the like.

3 Claims, 4 Drawing Figures

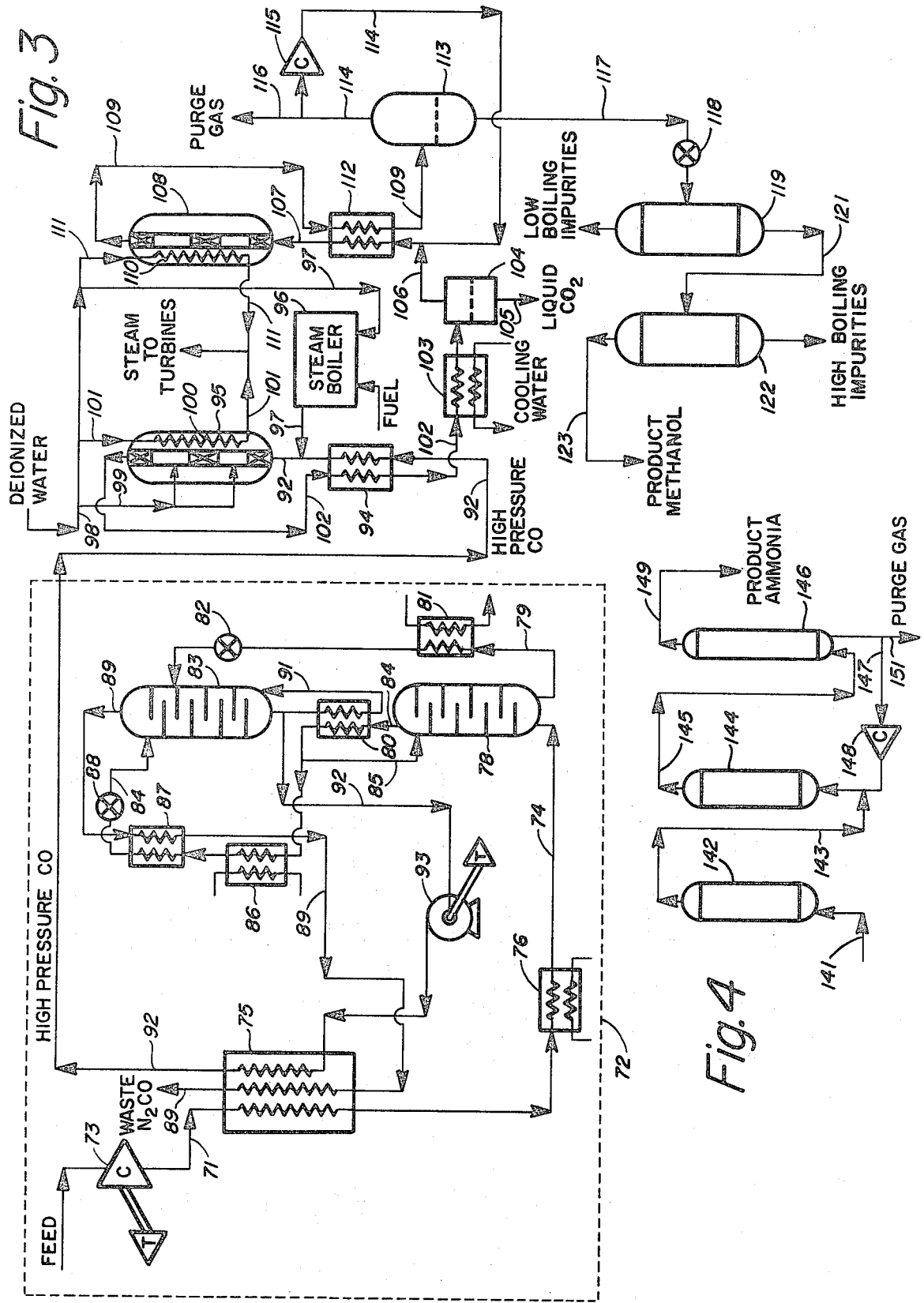

3,872,025

PRODUCTION AND UTILIZATION OF SYNTHESIS GAS

CROSS-REFERENCES TO RELATED APPLICATION

This application is a continuation-in-part of application Ser. No. 873,777, filed Oct. 31, 1969 and now abandoned.

BACKGROUND OF THE INVENTION

This invention relates to the production and utilization of synthesis gas, and more particularly to such production includinng the carbon monoxide-steam reaction.

Synthesis gas, comprising alone or in various combinations, hydrogen, nitrogen, and carbon oxides is the starting material, for syntheses including methanol and ammonia synthesis.

Customary sources of hydrogen synthesis gas include hydrocarbon steam reforming and hydrocarbon partial oxidation.

Methane is commonly used as the hydrocarbon in the hydrocarbon-steam reforming process, followed by a carbon monoxide shift reaction (water gas shift reaction) according to the equations:

1. $CH_4 + H_2O \rightarrow CO + 3 H_2$
2. $CO + H_2O \rightarrow H_2 + CO_2$

Attempts to bypass steam/methane reforming (equation 1) and manufacture hydrogen directly from carbon monoxide utilizing the carbon monoxide shift reaction (equation 2) by known processes has not been practiced on a commercial scale. Such processes, to be economical would require a large scale economic source of carbon monoxide which is unknown at present, and known carbon monoxide shift processes are not economical for available sources of carbon monoxide. In many instances, in fact, when carbon monoxide is present in processes for purifying hydrogen, economy dictates that it is to be regarded merely as an impurity to be removed.

Examples of industrial gases containing some carbon monoxide as one of the components include blast furnace gas, producer gas, etc. which have carbon monoxide present, but only in amounts ranging from about 5 to about 55 percent. A practical and economical process for using such low carbon monoxide gases has not been available.

The application of synthesis gas, in for example methanol synthesis, includes a first step in which the synthesis gas is compressed since the reaction progresses satisfactorily only at elevated pressures.

In the manufacture of synthesis gas it has been recognized, for example, in U.S. Pat. No. 3,514,260, that the necessary pressurization of the synthesis gas, prior to its use for methanol synthesis could be avoided if the synthesis gas could be produced under pressure. However a feasible method for achieving the large scale side manufacture of synthesis gas under high pressure has not heretofore been known.

Prior art processes still conventionally compress synthesis gas immediately prior to its use in the synthesis of methanol or ammonia in spite of the large energy input required in such compression. Alternatively attempts have been made to manufacture methanol at lower pressures.

No process is presently known which will simultaneously manufacture synthesis gas by the water gas shift reaction at pressures as high as 10,000 psia. and which is particularly suited to gas sources low in carbon monoxide, such as blast furnace gas.

SUMMARY OF THE INVENTION

The prior art inefficiencies of the carbon monoxide shift reaction as a starting point for the manufacture of synthesis gas have now been obviated by the process of the present invention which combines the carbon monoxide shift reaction with liquefaction to produce synthesis gas at pressures up to about 10,000 psia.

In the process of this invention, economies are realized by avoiding the prior art pressurizing step after the shift reaction and prior to using the synthesis gas for the manufacture of methanol, ammonia, or the like. By avoiding the usual compression of the synthesis gas prior to use in further synthesis, together with the inherent large scale energy input for such compression, and instead, pressurizing the carbon monoxide while it is in the liquid state, I have been able to provide a process which is both practical and economical for commercial use.

Briefly, the method of this invention comprises removal of carbon dioxide from carbon monoxide containing industrial gas and the introduction of the gas into a cryogenic treatment and distillation unit where at least a portion of the carbon monoxide present in the gas feed is liquefied. Distillation of the liquefied gas, to separate hydrogen and at least part of the nitrogen from the liquefied carbon monoxide is performed in the cryogenic distillation unit. Liquid carbon monoxide is then pumped to between about 500 and 10,0000 psia., heated to above its boiling point while maintaining the volume to produce a gaseous feed under pressure. The pressurized gas is then transferred to a high pressure shift converter, and reacted with steam while maintaining the pressure of 500 to about 10,000 psia. to produce hydrogen. Hydrogen formed in the high pressure shift conversion step, is utilized at the elevated pressure at which it is produced as synthesis gas in the synthesis at high pressure of, for example, methanol or ammonia.

For synthesis of methanol, the high pressure hydrogen, after removal of carbon dioxide, may be mixed with carbon monoxide taken directly from the cryogenic unit.

In the synthesis of ammonia, only part of the nitrogen is distilled off in the cryogenic unit, the remaining nitrogen being conveyed with carbon monoxide to the shift converter, from which it issues mixed with the resulting hydrogen, and the mixed gases are introduced into an ammonia synthesis unit.

BRIEF DESCRIPTION OF THE DRAWINGS

FIG. 3 is a detailed flow diagram for the production of methanol by the method of this invention.

FIG. 4 is a detailed flow diagram, in part, for the production of ammonia by the method of this invention.

DETAILED DESCRIPTION

Figure 1:
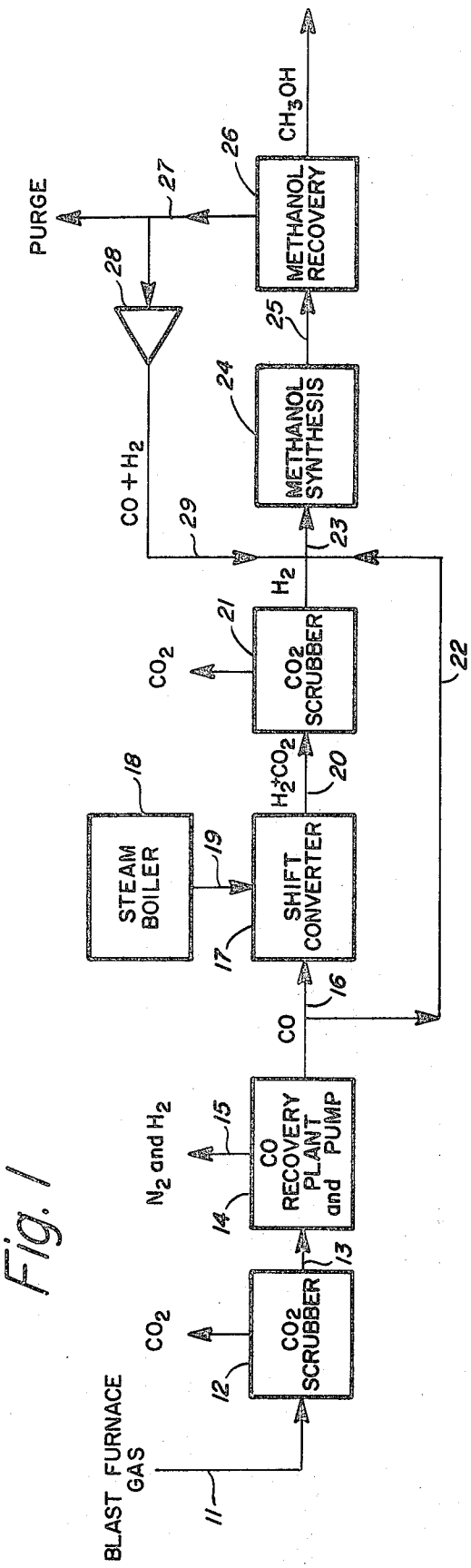
FIG. 1 is a simplified flow chart for the manufacture of synthesis gas and its utilization in the production of methanol.
Figure 2:
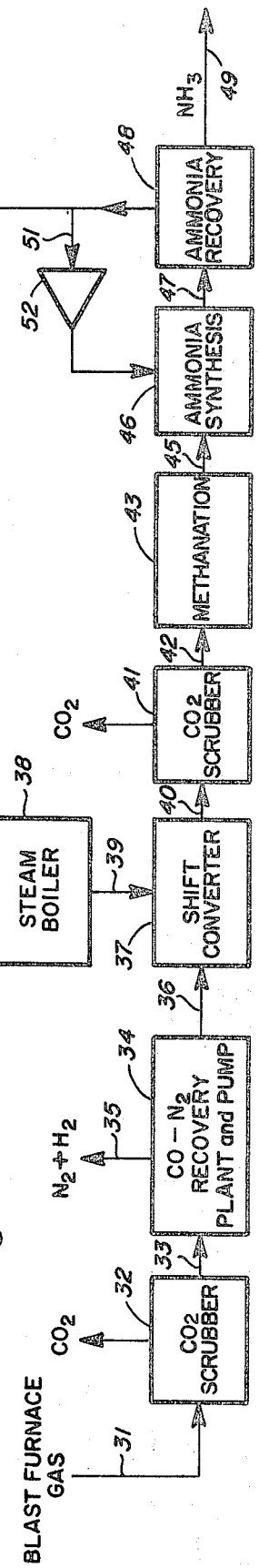
FIG. 2 is a simplified flow chart for the manufacture of synthesis gas and its utilization in the production of ammonia.

This invention in its broad aspect is outlined in FIGS. 1 and 2 for the manufacture of methanol and ammonia, respectively.

In FIG. 1, blast furnace gas, containing from about 5 to about 55 per cent carbon monoxide, nitrogen and smaller quantities of carbon dioxide and hydrogen, from line 11 is treated at absorber 12 to remove carbon dioxide. The remaining gas then enters a cryogenic unit 14 via line 13, where the gas is at least partially converted to the liquid phase. Hydrogen and nitrogen are separated from liquid carbon monoxide by fractional distillation and all gaseous components leave the unit as an overhead stream at line 15. The liquid carbon monoxide is pumped within the cryogenic unit to between about 500 and 10,000 psia. synthesis pressure and heated to above its boiling point while continuing to be maintained at substantially the same elevated pressure. A portion of the high pressure carbon monoxide is directed to shift converter 17 via line 16, where it is reacted at from about 500 to about 10,000 psia. with steam from boiler 18 by way of line 19, at a temperature of about 600° to 900° F. to form hydrogen and carbon dioxide. These newly formed gases, exiting at line 20, at the synthesis pressure, enter carbon dioxide scrubber 21. The scrubbed gas is joined with the remaining high pressure carbon monoxide from unit 14 by way of line 22, and the combined gases enter methanol synthesis reactor 24 from line 23. Methanol is catalytically synthesized at from about 500 to 10,000 psia. and 400° to 1000° F. temperature. Methanol, in gas phase, in conjunction with unreacted hydrogen and carbon monoxide, leaves reactor 24 by line 25 and enters methanol recovery unit 26, where the methanol is liquefied and separated from gases, and leaves recovery unit 26 as a 97 percent pure methanol product. Carbon monoxide and hydrogen leave the recovery unit 26 via line 27, and, after passing through compressor 28, where these gases are restored to the synthesis pressure, are recycled to reactor 24. Crude methanol is sent to a rectifier, not shown, where it is freed of higher or lower boiling impurities which may have formed in small amounts in the synthesis reactor.

The adaptability of this invention is shown in the flow chart of FIG. 2, wherein synthesis gas is utilized in the manufacture of ammonia.

In FIG. 2, blast furnace gas from line 31 is passed through an absorbent at 32 to free the feed gas of carbon dioxide. The thus treated gas is then introduced into cryogenic unit 34 via line 33. In the cryogenic unit, the feed gas is at least partially converted to the liquid phase, and hydrogen and part of the nitrogen are separated from liquid carbon monoxide by fractional distillation, exhausting as an overhead stream at line 35. It will be noted that the process of FIG. 2 differs from that of FIG. 1 at this point in that in the case of FIG. 2, sufficient nitrogen remains with the liquid carbon monoxide to produce a mixture having a carbon monoxide to nitrogen mole ratio of about 3 to 1. The liquid carbon monoxide-liquid nitrogen stream is pumped within the cryogenic unit to a pressure from about 500 to 10,000 psia., and warmed to ambient temperature while continuing to be maintained at substantially the same elevated pressure. This gas mixture leaves unit 34 via line 36 and is introduced, after rinsing the temperature into high pressure shift converter 37. Steam from boiler 38 enters converter 37 at line 39, and is reacted with the carbon monoxide of the feed gas mixture at a temperature of about 600° F. or higher to form hydrogen and carbon dioxide. The newly formed hydrogen and carbon dioxide, along with nitrogen, are transferred via line 40, to a carbon dioxide scrubber 41 to remove substantially all carbon dioxide from the system. The remaining mixture of hydrogen and nitrogen, in the approximate mole ratio of 3 to 1, is transferred, by way of line 42 to a methanation reactor 43, where any remaining carbon monoxide and carbon dioxide are reacted with hydrogen to form methane and water, both of which pass harmlessly through the ammonia synthesis train. The hydrogen-nitrogen mixture then enters ammonia synthesis reactor 46 via line 45. In reactor 46, the hydrogen-nitrogen mixture is catalytically synthesized to ammonia ($NH_3$) at 700° to 1000° F. and at a pressure that is essentially the 500 to 10,000 psia. pressure developed in the cryogenic carbon monoxide-nitrogen pump. Ammonia gas leaving reactor 46 via line 47 enters ammonia recovery unit 48, with part of the ammonia withdrawn at line 49 as product ammonia, and the remainder being recycled via line 51 and recycle compressor 52 to the synthesis reactor 46.

With certain variations, the process of this invention may be used in the synthesis of other compounds, for example, acetic acid.

For the use of this invention in the manufacture of methanol, a preferred detailed embodiment is given below.

Referring to FIG. 3, blast furnace feed gas having an original approximate analysis of 55 mole percent nitrogen, 25 percent carbon monoxide, 15 percent carbon dioxide and 5 percent hydrogen, and from which the carbon dioxide has been removed in a scrubber, not shown, enters compressor 73 within cryogenic unit 72 via line 71, the gas emerging from the compressor at 50 psia. The feed proceeds via line 71 to heat exchanger 75 and refrigeration unit 76. After leaving unit 76, the feed, now at a temperature of −278° F., has a liquid content of about 12.4 mole per cent. The average composition of this feed is approximately 30 percent carbon monoxide, 64 percent nitrogen, and 6 percent hydrogen. The feed enters the lower distillation column 78, from which a portion of the bottoms is withdrawn continuously via line 79 as an enriched liquid product having a composition of 37 percent carbon monoxide and 63 percent nitrogen. Withdrawn liquid passes through refrigeration unit 81, leaving at a temperature of −306° F. and a pressure of 45 psia. As a result of passing through pressure control valve 82, the liquid is reduced in pressure to 20 psia., and enters about midway of the upper distillation column 83. The major portion of the vapor effluent from column 78 is condensed in reboiler-condenser 80 by virtue of boiling a portion of the liquid issuing from the bottom of column 83. The condensed vapors are then used for reflux for the two columns, with about 65 percent of the total going to the upper column and 35 percent to the lower column via line 85. The portion going to the upper column, via line 84, is subcooled in refrigeration unit 86 and heat exchanger 87 to reduce the flashing that results from pressure reduction in throttling valve 88. THe low pressure vapor generated in reboiler-condenser 80 is passed through the low pressure column 83 where it is enriched in nitrogen, finally exiting at the top of the column as waste gas. By means of the heat and mass transfer effected in the system just described, a substantially pure liquid carbon monoxide stream is withdrawn from the bottom of column 83 at line 92. The liquid is liquid pumped by means of turbine pump 93 to a pressure of about 5000 psia. at a temperature of −270° F. and is then warmed to about 0° F. in heat exchanger 75. The waste gas containing about 74% nitrogen, 6 percent hydrogen and 20 percent excess carbon monoxide, emitting as overhead effluent from column 83, after passing through heat exchangers 87 and 75 via line 89, where the temperature is raised, is then exhausted for use as fuel gas.

The high pressure carbon monoxide passes through heat exchanger 94, where it is heated to a temperature of about 750° F. and is then introduced into shift converter 95. In converter 95, part of the carbon monoxide is reacted catalytically with steam in the presence of a chromia-promoted ferric oxide catalyst at the entering 5000 psia. pressure. The temperature in the converter is between 750° and 800° F. Steam, entering converter 95 via lines 97 and 92, is generated in boiler 96 from water purified by deionization. Water enters the boiler via line 97 from supply line 98. Deionized water is also supplied directly to the converter by way of line 99 for generation of additional steam. Steam generated in the converter may represent up to 50 percent of the total used in the converter reaction. Additonal water passes through a heat exchanger 100 in the converter, entering by way of line 101. The reaction in converter 95 produces hydrogen and carbon dioxide, which, along with unreacted carbon monoxide, is withdrawn continuously from the converter at line 102, and, after passing through heat exchanger 94 and 103, where the temperature of the mixed gases is lowered from 800° to about 85° F., the gas mixture enters phase separator 104, where carbon dioxide liquefies and is withdrawn at line 105. Hydrogen and carbon monoxide pass out of separator 104 via line 106, and, after passing through heat exchanger 112, and line 107 enter methanol synthesis reactor 108 at about 750° F. Hydrogen and carbon monoxide, present in an approximate mole ratio of 2 to 1, are reacted catalytically in the presence of a zinc chromite catalyst at a pressure of about 5000 psia. Resultant methanol, in gas phase, leaves the reactor at line 109. Deionized water passes through reactor 108 by way of line 111, and resultant steam is combined with that removed from converter 95 at line 101 for use in the several turbines operating in earlier stages of the process. Methanol, after passing through heat exchanger 112, via line 109, where the temperature is reduced from 800° to about 150° F., enters phase separator 113, from which unreacted gases are discharged overhead at line 114 and recycled through compressor 115, and through heat exchanger 112, where it is combined with the feed from line 106 at a pressure of 5000 psia. Some of the overhead gas is bled from the system at line 116 to prevent the buildup of inerts in the synthesis loop. Crude methanol, removed from the bottom of separator 113 enters distillation column 119 by way of line 117 and pressure control valve 118, where low boiling impurities such as acetone, methyl ether and methyl formate are removed as an overhead stream, with methanol being withdrawn via line 121 to distillation column 122, where high boiling impurities, including ethanol, propanol, etc. are withdrawn as bottoms, methanol leaving column 122 via line 123 as product methanol.

It will be recognized that many variations of operating technique may be utilized in the process without any substantial loss in efficiency. For example, under certain operating conditions, other synthesis pressures, in the range of from 500 to 10,000 psia. will offer advantages in efficency over the 5000 psia. pressure of the above example. The temperature for the methanol synthesis may range from 400° to 1000° F.

The initial process step of liquefaction and distillation may vary within wide ranges of pressure and temperature. That is, carbon monoxide liquefies at −311° F. temperature at atmospheric pressure. However, as pressure increases, the temperature of liquefaction also increases, as is well known in the art and any combination of pressure and temperature which will liquefy a sufficient fraction of the industrial gas stream to accomplish the fractional distillation is within the scope of this invention.

Shift conversion temperature may range from 600° to 900° F. Carbon dioxide scrubbers may be of the chemically reactive type using sodium carbonate or ethanolamine. A relatively wide range of catalysts, as is well known in the art, is available for the catalytic reactions in the shift converter and the methanol reactor. Catalysts including alumina-supported cobalt, magnesia or platinum are operable in the former, while zinc chromite or metal oxide-promoted copper-based materials may be used as catalysts in the latter. Relatively pure water from sources other than a deionizer are adaptable to steam generation.

The particular series of heat exchangers and refrigeration units described is calculated to produce the most efficient operation in the overall process. However, exact location, type and capacity of heat exchangers and refrigeration units will be dictated largely by the type of processing equipment employed, as, for example, the specific type of reactor vessels and distillation columns used, and their location, one with another.

Referring again to FIG. 1, it will be observed that it has been indicated therein that only sufficient carbon monoxide has been supplied to the shift converter to combine with steam to form hydrogen, and that the carbon monoxide used for the methanol reaction is supplied directly to the methanol reactor from the cryogenic unit.

The method detailed in FIG. 3 is alternative to that of FIG. 1 in that carbon monoxide for the methanol reaction is transferred directly through the shift converter to the methanol synthesis reactor, along with the newly formed hydrogen. The method of FIG. 3 effects an economy of capital and operating costs by reducing the size of the shift converter, and decreasing the amount of steam supplied to the converter as a result of the favorable effect of the excess carbon monoxide on the water gas shift equilibria.

The cryogenic pumping of liquid carbon monoxide to methanol synthesis pressure before conversion of carbon monoxide to hydrogen synthesis gas in the steam shift conversion reaction, effects considerable savings over the conventional ambient temperature synthesis gas compression step required in conventional methanol synthesis. The elevated pressure is attained while the carbon monoxide is liquid and easily pressurized with a minimum of equipment and may then be conveniently heated to reaction temperatures without loss of the elevated pressures already attained.

In the shift conversion reaction, the equilibrium conversion and rate of reaction are not significantly affected by pressure. At the typical temperatures of 600° to 700° F., the reaction may be conducted at pressures considerably higher than the 5000 psia. of the detailed example. Very efficient operation can be maintained in the pressure range of 5000 to 10,000 psia.

A major advantage of the process of this invention resides in the energetics of the overall reaction, which is

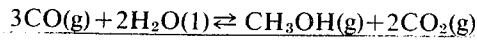
$$3CO(g) + 2H_2O(l) \rightleftarrows CH_3OH(g) + 2CO_2(g)$$

The molar heat of reaction ($\Delta H_R$) equals $-20.4$ K.cal./gm. mole, which, for a 1000-ton per day plant, represents 37,400 thermal horsepower available for generation of steam.

The compressor power required for the process, including that required to operate the carbon monoxide recovery plant is about 26,500 BHP. About 10,700 BHP of this requirement can be generated from the available 37,400 thermal horsepower at an efficiency of 29.5 percent. Additional fuel in the amount of $3.40 \times 10^6$ Btu./ton of methanol is required to supply the balance of the power, or less than one-sixth of that required in a conventional methanol synthesis process.

When applying the method of this invention to ammonia synthesis, a blast furnace gas is passed through the steps of carbon dioxide removal, recovery of carbon monoxide in a 3 to 1 ratio with nitrogen in a cryogenic unit, pressure pumping the carbon monoxide-nitrogen mixture to a shift converter for reaction with steam, and second stage carbon dioxide removal, as shown in the flow chart of FIG. 2. In more detail, these steps will be preformed in essentially the same manner as the corresponding steps described for the methanol synthesis shown in FIG. 3, differing only in that for ammonia synthesis, nitrogen from the blast furnace gas, in the ratio of one part nitrogen to three parts carbon monoxide is carried through the entire sequence of steps prior to the synthesis reactor. After the second stage carbon dioxide removal step, the gas still contains some carbon monoxide which should be removed prior to ammonia synthesis.

Referring to FIG. 4, mixed hydrogen-nitrogen gas in the ratio of 3 to 1, which has been obtained from, for example, carbon dioxide removal step 41 of FIG. 2 or phase separator 104 of FIG. 3, enters methanation reactor 142 via line 141, where the residual carbon monoxide an carbon dioxide are reacted catalytically with hydrogen in the presence of a nickel catalyst at a temperature of 800° F. and a pressure of 5000 psia. The methane product of this reaction passes harmlessly through the remainder of the process. The hydrogen-nitrogen feed mixture is transferred, by way of line 143 to ammonia synthesis reactor 144, wherein the feed is reacted catalytically in the presence of an iron oxide catalyst at a temperature of 800° F. and a pressure of 5000 psia. The synthesis is performed continuously, with ammonia and unreacted synthesis gas being removed from the synthesis reactor to a recovery vessel 146 via line 145. Ammonia product is removed from the recovery vessel via line 149, while unreacted synthesis gas is recycled to the synthesis reactor through line 147 and compressor 148. Some of this recycled gas is bled from the system at line 151 to prevent the buildup of inerts in the synthesis loop.

The methanation and ammonia synthesis pressure may range fromo 500 to 10,000 psia., with a temperature range of from 600° to 700° F. for the methanation and from 700° to 1000° F. for the ammonia synthesis reaction.

The overall reaction in the ammonia synthesis is $\frac{1}{2}N_2(g) + 3/2CO(g) + 3/2H_2O(l) \rightleftarrows NH_3(g) + 3/2CO_2(g)$ and the heat of reaction ($\Delta H_R$) equals $-10.0$ K. cal./gm. mole. This heat of reaction (for a 1000-ton per day plant) represents 34,500 thermal horsepower available for the generation of steam in the process.

If the original gas feed for the ammonia synthesis contains no, or little, nitrogen, nitrogen would have to be supplied separately to the synthesis reactor 114, and raised at ambient temperature to the ammonia synthesis pressure.

It is to be understood that all percentages relating to gas stream compositions, in the examples of this invention, refer to mole per cent.

I claim:

1. An improved method of making prepressurized synthesis gas containing hydrogen from a low grade carbon monoxide containing industrial gas, after an initial removal of carbon dioxide, comprising:
   a. cryogenically processing the carbon dioxide free industrial gas to form liquid carbon monoxide and cryogenically separating the carbon monoxide from the industrial gas as a liquid,
   b. pumping the carbon monoxide as a liquid to raise the pressure of the liquid to from about 500 to 10,000 psia.,
   c. heating the pressurized liquid carbon monoxide to above its boiling point while maintaining the pressure to produce without phase change a gaseous feed at between 500 and 10,000 psia.,
   d. passing the pressurized feed gas to a high pressure catalytic water gas shift reactor and reacting said gas at substantially the pressure obtained in step (b) with steam of substantially the same pressure and at a temperature of from about 600° to about 900° F. to form prepressurized synthesis gas containing hydrogen and carbon monoxide and carbon dioxide.

2. The method of claim 1 in which the industrial gas is blast furnace gas.

3. The method of claim 1 in which the pressure of step (b) and (c) is about 5000 psia.

* * * * *